US011455655B2

(12) United States Patent
Taghavi Nasr Abadi et al.

(10) Patent No.: US 11,455,655 B2
(45) Date of Patent: Sep. 27, 2022

(54) METHODS AND APPARATUS FOR ELECTRONICALLY PROVIDING ITEM RECOMMENDATIONS FOR ADVERTISEMENT

(71) Applicant: Walmart Apollo, LLC, Bentonville, AR (US)

(72) Inventors: Zeinab Taghavi Nasr Abadi, Oakland, CA (US); Habibur Rahman, San Jose, CA (US); Najmeh Forouzandehmehr, Sunnyvale, CA (US); Xilun Chen, Sunnyvale, CA (US); Jianpeng Xu, San Jose, CA (US); Anant Maheshwari, Sunnyvale, CA (US); Sriram Guna Sekhar Kollipara, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/722,467

(22) Filed: Dec. 20, 2019

(65) Prior Publication Data
US 2021/0192568 A1    Jun. 24, 2021

(51) Int. Cl.
*G06Q 30/02* (2012.01)
*G06N 20/00* (2019.01)

(52) U.S. Cl.
CPC ......... *G06Q 30/0254* (2013.01); *G06N 20/00* (2019.01)

(58) Field of Classification Search
CPC .......... G06F 16/9535; G06F 16/24578; G06Q 30/0269; G06Q 30/0631; G06Q 30/00; G06Q 30/02
See application file for complete search history.

(56) References Cited

U.S. PATENT DOCUMENTS 8,019,642 B2    9/2011  Selinger et al.
8,108,329 B2    1/2012  Selinger et al.
(Continued)

OTHER PUBLICATIONS

Brownlee, Jason, What Are Word Embeddings for Text?, dated Oct. 11, 2017, downloaded Jul. 2, 2021 from https://machinelearningmastery.com/what-are-word-embeddings/.
(Continued)

*Primary Examiner* — Saba Dagnew
(74) *Attorney, Agent, or Firm* — Duane Morris LLP; Manita Rawat

(57) ABSTRACT

This application relates to apparatus and methods for automatically determining and providing recommendations of items to advertise customers. In some examples, a computing device generates feature data based on historical website interaction data, historical transaction data, and item categorical data. The computing device trains each of a plurality of machine learning models based on the generated feature data. The computing device may then receive a plurality of recommended items to advertise in association with an anchor item. The computing device may execute the trained machine learning process to generate prediction data associated with a future time period. The prediction data may identify a number of times each recommended item may be purchased during the future time period. The computing device may then rank the plurality of recommended items based on the prediction data. In some examples, the computing device filters the plurality of recommended items based on item categories.

18 Claims, 9 Drawing Sheets

(56) References Cited

U.S. PATENT DOCUMENTS

| | | | |
|---|---|---|---|
| 8,364,528 | B2 | 1/2013 | Selinger et al. |
| 8,392,429 | B1 | 3/2013 | Clancy et al. |
| 8,473,349 | B1 | 6/2013 | Manber et al. |
| 8,554,629 | B2 | 10/2013 | Barton et al. |
| 8,583,524 | B2 | 11/2013 | Selinger et al. |
| 8,615,442 | B1 * | 12/2013 | Kapur ............... G06Q 30/0269 |
| | | | 705/26.1 |
| 8,924,265 | B2 | 12/2014 | Selinger et al. |
| 9,009,154 | B2 | 4/2015 | Rinckes et al. |
| 9,734,503 | B1 | 8/2017 | Gargi |
| 10,007,946 | B1 * | 6/2018 | Levy .................. G06Q 30/0631 |
| 10,318,993 | B2 | 6/2019 | Baghaie et al. |
| 10,521,831 | B2 | 12/2019 | Putrevu et al. |
| 10,706,450 | B1 | 7/2020 | Tavernier |
| 10,902,341 | B1 * | 1/2021 | Qureshi ................ G06Q 10/10 |
| 2005/0222987 | A1 * | 10/2005 | Vadon ................... G06F 16/907 |
| 2007/0038614 | A1 | 2/2007 | Guha |
| 2007/0083611 | A1 | 4/2007 | Farago et al. |
| 2007/0240207 | A1 | 10/2007 | Belakhdar et al. |
| 2008/0235085 | A1 | 9/2008 | Kovinsky et al. |
| 2008/0243816 | A1 * | 10/2008 | Chan ..................... G06Q 30/00 |
| | | | 707/999.005 |
| 2009/0228277 | A1 | 9/2009 | Bonforte et al. |
| 2009/0259632 | A1 | 10/2009 | Singh |
| 2010/0138452 | A1 | 6/2010 | Henkin et al. |
| 2011/0078127 | A1 | 3/2011 | Lin et al. |
| 2011/0238478 | A1 # | 9/2011 | Gottfurcht ............ G06Q 30/02 |
| | | | 705/14.25 |
| 2012/0012406 | A1 | 1/2012 | Stoicoviciu |
| 2013/0166303 | A1 | 6/2013 | Chang et al. |
| 2013/0211879 | A1 | 8/2013 | Holland |
| 2013/0211925 | A1 | 8/2013 | Holland |
| 2013/0290117 | A1 | 10/2013 | Urban |
| 2013/0315475 | A1 | 11/2013 | Song et al. |
| 2014/0180790 | A1 | 6/2014 | Boal |
| 2014/0180793 | A1 | 6/2014 | Boal |
| 2014/0180802 | A1 | 6/2014 | Boal |
| 2014/0180806 | A1 | 6/2014 | Boal |
| 2014/0180807 | A1 | 6/2014 | Boal |
| 2014/0180808 | A1 | 6/2014 | Boal |
| 2014/0180809 | A1 | 6/2014 | Boal |
| 2014/0180810 | A1 | 6/2014 | Boal |
| 2014/0180811 | A1 | 6/2014 | Boal |
| 2016/0225015 | A1 | 8/2016 | Subramanya et al. |
| 2017/0090867 | A1 * | 3/2017 | Lifar ........................ G06F 7/24 |
| 2017/0097490 | A1 | 4/2017 | Chen et al. |
| 2017/0097940 | A1 | 4/2017 | Panuganty |
| 2017/0262899 | A1 | 9/2017 | Geraghty et al. |
| 2018/0060908 | A1 | 3/2018 | Kenthapadi |
| 2018/0075512 | A1 | 3/2018 | Bui et al. |
| 2018/0218428 | A1 * | 8/2018 | Xie ........................ G06N 20/00 |
| 2019/0163758 | A1 * | 5/2019 | Zhivotvorev ..... G06F 16/24578 |
| 2019/0266285 | A1 * | 8/2019 | Wang .................. G06F 16/958 |
| 2019/0347347 | A1 | 11/2019 | Griffith |
| 2020/0005347 | A1 | 1/2020 | Boal |
| 2020/0104898 | A1 * | 4/2020 | Cui .................... G06Q 30/0631 |
| 2020/0285944 | A1 | 9/2020 | Lee et al. |
| 2021/0012406 | A1 | 1/2021 | Wadhwa et al. |
| 2021/0073891 | A1 | 3/2021 | Al Jadda et al. |

OTHER PUBLICATIONS

Karani, Dhruvil, Introduction to Word Embeddings and Word2Vec, dated Sep. 1, 2018, downloaded Jul. 2, 2021 from https:// towardsdatascience.com/introduction-to-word-embedding-and-word2vec-652d0c2060fa.

Deng, Houtao, Recommender Systems in Practice—How companies make product recommendations, dated Feb. 13, 2019, downloaded Jul. 2, 2021 from https://towardsdatascience.com/recommender-systems-in-practice-cef9033bb23a.

Foote, Keith D., A Brief History of Machine Learning, dated Mar. 26, 2019, downloaded from https://www.dataversity.net/ a-brief-history-of-machine-learning/# on Apr. 13, 2021.

Contextual searching, from Wikipedia, dated Sep. 27, 2018, from https://en.wikipedia.org/w/index.php?title=Contextual_searching &oldid=861390169, downloaded Jan. 20, 2022.

Maruti Techlabs, What are Product Recommendation Engines? And the various versions of them?, dated Sep. 28, 2017, downloaded Oct. 8, 2021 from https://towardsdatascience.com/ what-are-product-recommendation-engi nes-and-the-vari ous-versi ons-of-them-9dcab4ee26d5 (Year: 2017).

Jorge Martinez-Gil, An overview of textual semantic similarity measures based on web intelligence, Artificial Intelligence Review, Springer Verlag, 2012,42 (4), pp. 935-943. (10.1007/s 10462-012-9349-8. hal-01630890) dated 2012, downloaded from https:// hal .archives-ouvertes.fr/hal-01630890/document (Year: 2012).

* cited by examiner

METHODS AND APPARATUS FOR ELECTRONICALLY PROVIDING ITEM RECOMMENDATIONS FOR ADVERTISEMENT

TECHNICAL FIELD

The disclosure relates generally to digital advertisements and, more specifically, to electronically determining and providing item recommendations for advertisement.

BACKGROUND

At least some websites, such as retailer websites, display item advertisements. The item advertisements may include an image of an item, and a price of the item. For example, a website may display item advertisements, and may further allow a customer to purchase the advertised items. The displayed advertisements may be determined by advertisement recommendation systems, which attempt to provide advertisements for items which customers may be interested in. In some examples, however, the advertisement recommendation systems provide advertisements for items that are irrelevant to the customer, or for items the customer is not interested in.

As a result, a retailer may lose sales of items to a customer. For example, the customer may not buy the advertised item. In addition, the customer may leave the website without having purchased an item that, if shown an advertisement for, the customer would have purchased. In some examples, if a customer perceives an advertisement as irrelevant, the customer may go elsewhere, such as another website, to make purchases. As such, there are opportunities to address advertisement recommendation systems.

SUMMARY

The embodiments described herein are directed to automatically determining and providing digital item advertisements that may be displayed, for example, on a website. The embodiments may allow a person, such as a customer, to be presented with advertisements that may be more relevant to (e.g., likely to interest) the person. For example, the embodiments may allow the person to view advertisements that the person may be more willing to purchase. As such, the embodiments may allow a retailer to increase item advertisement conversions (e.g., an amount of advertised items sold). In addition, because a person may now spend less time reviewing irrelevant advertisements, the person may have additional time to consider additional items for purchase. In addition to or instead of these example advantages, persons of ordinary skill in the art having the benefit of these disclosures may recognize and appreciate other advantages as well.

In accordance with various embodiments, exemplary systems may be implemented in any suitable hardware or hardware and software, such as in any suitable computing device. For example, in some embodiments, a computing device generates feature data based on historical website interaction data, historical transaction data, and item categorical data. The computing device trains each of a plurality of machine learning models based on the generated feature data. The computing device may then receive a plurality of recommended items to advertise in association with an anchor item. The computing device may execute the trained machine learning process to generate prediction data associated with a future time period. The prediction data may identify a number of times each recommended item may be purchased during the future time period. The computing device may then rank the plurality of recommended items based on the prediction data. In some examples, the computing device filters the plurality of recommended items based on item categories.

In some embodiments, a computing device is configured to receive, for an anchor item, a plurality of recommended items. The computing device may be configured to generate, for each recommended item of the plurality of recommended items, features based on session activity data. Further, the computing device may be configured to execute a trained machine learning process based on the generated features for each of the plurality of recommended items. The computing device may also be configured to generate prediction data for each of the recommended items based on the execution of the trained machine learning process. The computing device may be configured to generate a ranking of the plurality of recommended items based on the prediction data. In some examples, the computing device may be configured to transmit the ranking of the plurality of recommended items. For example, the computing device may transmit the ranking of the plurality of recommended items to a web server, where the web server displays one or more of the item advertisements in ranked order.

In some examples, the computing device is configured to generate categorical attribute embeddings based on the session activity data, and filter the ranking of the plurality of recommended items based on the categorical attribute embeddings.

In some embodiments, a method is provided that includes receiving, for an anchor item, a plurality of recommended items. The method also includes generating, for each recommended item of the plurality of recommended items, features based on session activity data. The method may also include executing a trained machine learning process based on the generated features for each of the plurality of recommended items. Further, the method may include generating prediction data for each of the recommended items based on the execution of the trained machine learning process. The method may also include generating a ranking of the plurality of recommended items based on the prediction data. In some examples, the method may include transmitting the ranking of the plurality of recommended items.

In some examples, the method includes generating categorical attribute embeddings based on the session activity data, and filtering the ranking of the plurality of recommended items based on the categorical attribute embeddings.

In yet other embodiments, a non-transitory computer readable medium has instructions stored thereon, where the instructions, when executed by at least one processor, cause a computing device to perform operations that include receiving, for an anchor item, a plurality of recommended items. The operations may also include generating, for each recommended item of the plurality of recommended items, features based on session activity data. The operations may also include executing a trained machine learning process based on the generated features for each of the plurality of recommended items. Further, the operations may include generating prediction data for each of the recommended items based on the execution of the trained machine learning process. The operations may also include generating a ranking of the plurality of recommended items based on the prediction data. In some examples, the operations may include transmitting the ranking of the plurality of recommended items.

In some examples, the operations include generating categorical attribute embeddings based on the session activity data, and filtering the ranking of the plurality of recommended items based on the categorical attribute embeddings.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
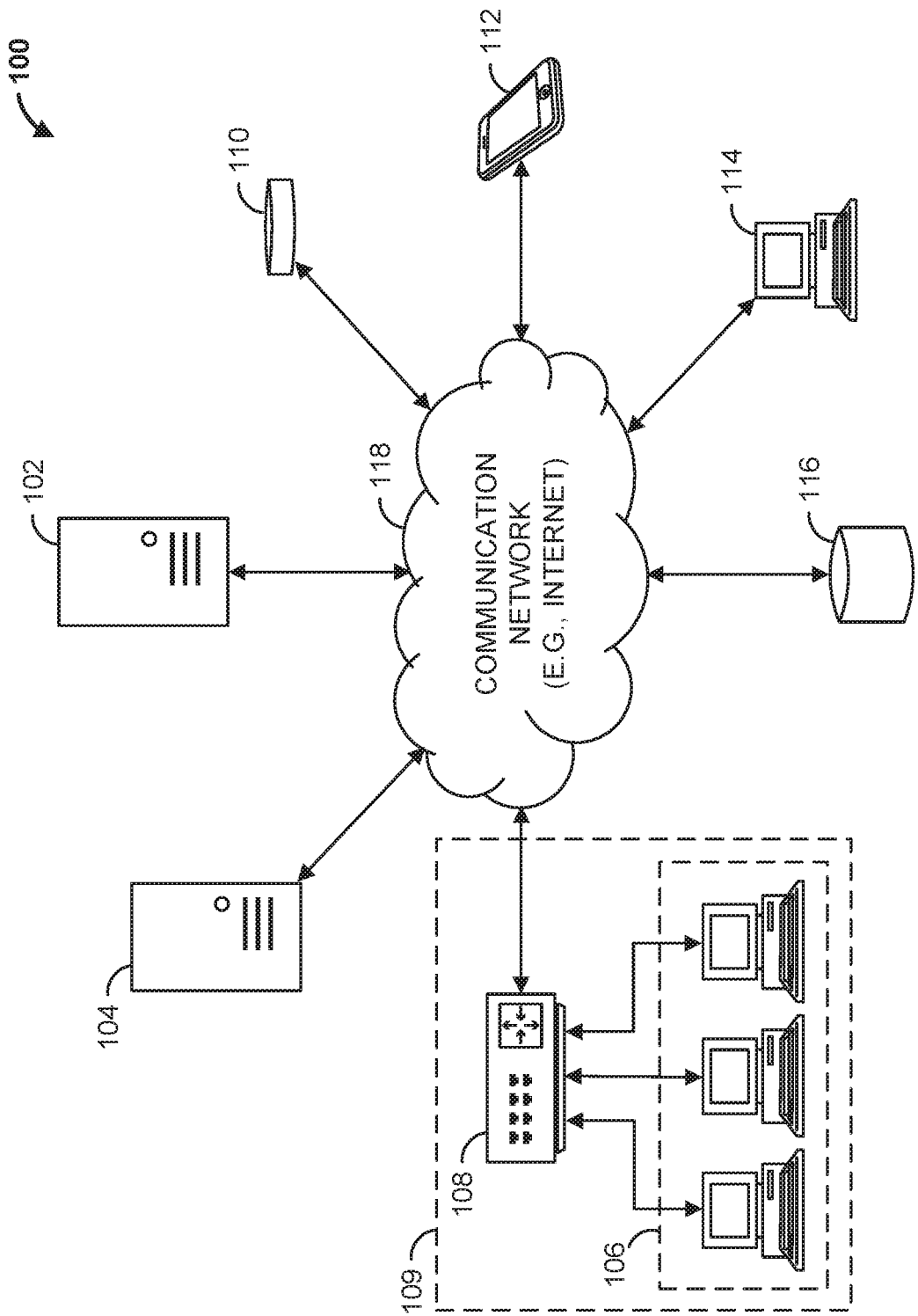
FIG. 1 is a block diagram of a digital advertisement recommendation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital advertisement recommendation system 100 that includes an advertisement recommendation computing device 102 (e.g., a server, such as an application server), a web server 104, workstation(s) 106, database 116, and multiple customer computing devices 110, 112, 114 operatively coupled over network 118. Advertisement recommendation computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, advertisement recommendation computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, advertisement recommendation computing device 102 is operated by a retailer, and multiple customer computing devices 112, 114 are operated by customers of the retailer.

Although FIG. 1 illustrates three customer computing devices 110, 112, 114, digital advertisement recommendation system 100 can include any number of customer computing devices 110, 112, 114. Similarly, digital advertisement recommendation system 100 can include any number of workstation(s) 106, advertisement recommendation computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with advertisement recommendation computing device 102 over communication network 118. The workstation(s) 106 may send data to, and receive data from, advertisement recommendation computing device 102. For example, the workstation(s) 106 may transmit data related to an order purchased by a customer at store 109 to advertisement recommendation computing device 102. In response, advertisement recommendation computing device 102 may transmit an indication of one or more item advertisements to provide to the purchasing customer. For example, the item advertisements may be displayed on a receipt handed to the customer for the purchase order.

In some examples, web server 104 may host one or more web pages, such as a retailer's website. The website may allow a customer to purchase items. For example, the website may display advertisements for items that a customer may purchase on the website. In some examples, advertisement recommendation computing device 102 may transmit one or more item advertisements to display on the website. For example, the item advertisements may be displayed on a checkout webpage, on a homepage, on an item webpage, or on a webpage dedicated to a category of the advertised item, such as when a customer is browsing that webpage.

In some examples, web server 104 transmits user session data and/or purchase order data for customers viewing webpages hosted by web server 104 to advertisement recommendation computing device 102. Advertisement recommendation computing device 102 may train one or more machine learning processes to determine item advertisements based on the user session data and/or purchase order data.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. An operator of one of multiple computing devices 110, 112, 114 may access the website hosted by web server 104, add one or more items to an online shopping cart of the website, and perform an online checkout of the shopping cart to purchase the items.

Advertisement recommendation computing device 102 is operable to communicate with database 116 over communication network 118. For example, advertisement recommendation computing device 102 can store data to, and read data from, database 116. Database 116 can be a remote storage device, such as a cloud-based server, a memory device on another application server, a networked computer, or any other suitable remote storage. Although shown remote to advertisement recommendation computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Advertisement recommendation computing device 102 can determine item advertisements to be displayed on a webpage, such as one hosted by web server 104. To determine the item advertisements, advertisement recommendation computing device 102 may train one or more machine learning processes (e.g., algorithms). To train the machine learning processes, advertisement recommendation computing device 102 may obtain data identifying a plurality of anchor item and candidate recommended item pairs. An anchor item may be, for example, an item a customer is viewing on a webpage. A candidate recommended item may be an item for which an advertisement may be displayed. An advertisement for the candidate recommended item may be displayed, for example, while a user is browsing a webpage dedicated to the anchor item, or on a webpage illustrating that the anchor item has been added to an online shopping cart (e.g., checkout webpage), for example.

For each anchor item and candidate recommended item pair, advertisement recommendation computing device 102 may generate interaction data. Advertisement recommendation computing device 102 may generate interaction data based on obtained user session data for a plurality of users. For example, the user session data may identify items viewed, engaged (e.g., clicked on), or purchased on a website, such as a website hosted by web server 104. User session data may also identify, for example, item advertisement impressions, items added to an online shopping cart, or items purchased after an engagement on the website of an advertisement for the items. User session data may also identify any other data related to the browsing of a website.

Advertisement recommendation computing device 102 may generate interaction data based on user session data for each anchor item and candidate recommended item pair. For example, interaction data for each anchor item and candidate recommended item pair may be generated based on customer interactions with item advertisements for the recommended item when the customers view or engage the corresponding anchor item. Interaction data may also be generated based on determining aggregated co-counts such as, for example, co-views, co-purchases, or view-buy counts, for each anchor item and candidate recommended item pair. Co-views may identify a number of times where an anchor item and a recommendation item are viewed together during a session. Co-purchases may identify a number of times where an anchor item and a recommendation item are bought during a same user session. Aggregated view-buy counts may be, for example, a total number of times each anchor item and recommended item has been viewed (e.g., advertisement for the anchor item and recommended item, image of anchor item and recommended item, etc.) and/or purchased. In some examples, the interaction data may be generated based on user session data over a previous amount of time. The interaction data may be stored in database 116.

Advertisement recommendation computing device 102 may also determine popularity data for each item (e.g., anchor and recommended item). Popularity data may include, for example, a number of impressions of each item, a total number of sales for each item, a pricing of each item, ratings or reviews for each item, and numbers of ratings or reviews for each item. Popularity data may be based, for example, on sales made on a website hosted by web server 104, and on sales made at store 109, for example.

Further, advertisement recommendation computing device 102 may determine categorical item data for each item. Categorical data may identify for each item, for example, a primary shelf. The primary shelf of each item may be based on a taxonomical hierarchy that defines which category a product belongs to. For example, a primary shelf for brand "A" laptops may be: Electronics/Computers/Laptops/Brand A Laptops.

Additionally or alternatively, categorical data may identify a product type, a brand, a division, a department (e.g., a retailer department, such as meat, dairy, or produce departments) a category, and a subcategory. Categorical data may also identify other categorical data related to each item.

Advertisement recommendation computing device 102 may generate feature data for each anchor item and candidate recommended item pair based on one or more of interaction data, popularity data, and categorical item data. For example, advertisement recommendation computing device 102 may generate a feature vector for each anchor item and candidate recommended item pair, where each feature vector identifies the anchor item, the recommended item, and corresponding features. In some examples, the features include view-buy counts, contextual, and categorical features, as well as aggregated view-buy count features.

Figure 4:
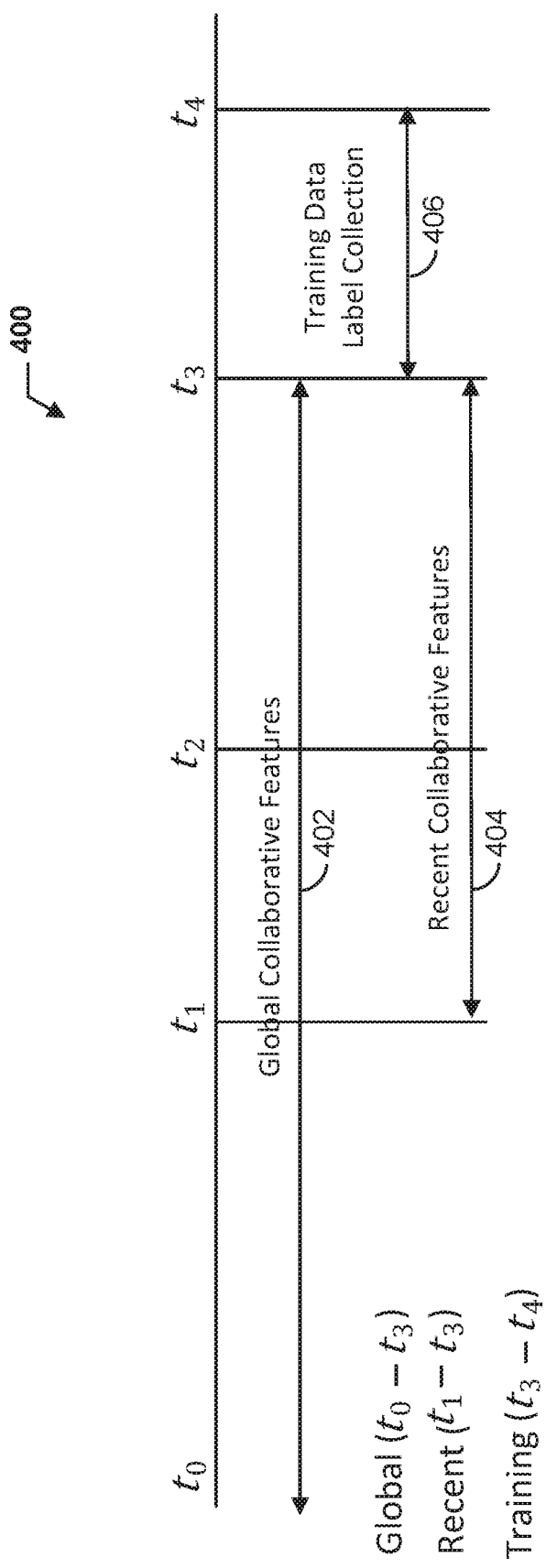
FIG. 4 illustrates a timeline of a training period for training a machine learning process executed by the advertisement recommendation computing device of FIG. 2 in accordance with some embodiments.

In some examples, feature data is generated based on interaction data, popularity data, and categorical item data corresponding to a previous period of time. For example, as illustrated in FIG. 4, timing diagram 400 illustrates that global collaborative features 402 may be generated over a period between time $t_0$ and $t_3$. In some examples, global collaborative features 402 may be generated for a period of three years. Advertisement recommendation computing device 102 may first train the machine learning model with global collaborative features 402.

In some examples, feature data may be generated over a more recent period. For example, as indicated in FIG. 4, recent collaborative features 404 may be generated over a period between time $t_1$ and $t_3$. Recent collaborative features 404 may be generated periodically, such as every eighty days, every three months, every month, every week, etc. Advertisement recommendation computing device 102 may retrain the machine learning algorithm with recent collaborative features 404. For example, advertisement recommendation computing device 102 may periodically generate recent collaborative features 404 periodically, and retrain the machine learning process accordingly with the generated recent collaborative features 404. Global collaborative features 402 and/or recent collaborative features 404 may be generated during training data and label collection period 406.

Advertisement recommendation computing device 102 may train one or more machine learning processes based on the feature data. In some examples, features identifying aggregated view-buy counts are used as labels to train the machine learning process. Each machine learning process may be, for example, a machine learning model (e.g., a machine learning algorithm). In some examples, the machine learning process may be based on decision trees, such as an XGBoost based models. In some examples, the machine learning process may be based on neural networks, or deep learning algorithms, for example.

In some examples, the machine learning process includes a plurality of machine learning models, where each machine learning model is trained with feature data associated with a particular item type (e.g., item division). For example, advertisement recommendation computing device 102 may train a first item-type machine learning model based on feature data for anchor item and recommended item pairs associated with a first item type. Advertisement recommendation computing device 102 may also train a second item-type machine learning model based on feature data for anchor item and recommended item pairs associated with a second item type. Each item type may be, for example, a category of items, a product type of items, a division of items, a primary shelf of items, or any other categorical identification of items.

Once trained, advertisement recommendation computing device 102 may execute the machine learning process to identify recommended item advertisements. For example, advertisement recommendation computing device 102 may execute the machine learning process to determine (e.g., identify) one or more of a plurality of recommended item advertisements to be displayed. For example, given an anchor item and a plurality of recommended item advertisements for that anchor item, advertisement recommendation computing device 102 may execute the machine learning process to identify a ranking of the plurality of recommended item advertisements. In some examples, one or more of higher ranked recommended item advertisements are displayed with the anchor item on a webpage, such as a webpage hosted by web server 104. In some examples, execution of the machine learning process results in generating scores for each recommended item. Recommended items with higher scores are ranked ahead of recommended items with lower scores. In some examples, advertisement recommendation computing device 102 provides a list ranking the recommended advertisements. In some examples, the recommended advertisements are displayed in order according to the list.

In some examples, advertisement recommendation computing device 102 executes the machine learning process to generate data values corresponding to a future time period (e.g., for a specific time slot, day of the week, month, etc.). For example, for each anchor item and candidate recommended item pair, advertisement recommendation computing device 102 may execute the machine learning process to generate view-buy count data identifying a number of times, during the future time period, that an advertisement for the recommended item, if displayed with the anchor item (e.g., displayed on an item page for the anchor item), will be viewed or engaged. In some examples, the view-buy count data identifies a predicted number of times that the recommended item will be bought if displayed with the anchor item. Based on the predicted view-buy count data, advertisement recommendation computing device 102 may rank advertisements for recommended items.

In some examples, advertisement recommendation computing device 102 generates categorical attribute embeddings based on obtained users' session data. The categorical attribute embeddings are based on categories of items identified in the users' session data. Advertisement recommendation computing device 102 may re-rank, or filter, the ranked recommended items based on a similarity with item categories associated with the generated categorical attribute embeddings. For example, advertisement recommendation computing device 102 may allow recommended items associated with categories identified in the generated categorical attribute embeddings, and filter out items not associated with those categories. As such, items that are very different (e.g., as defined by the categorical similarity) are not allowed.

Figure 2:
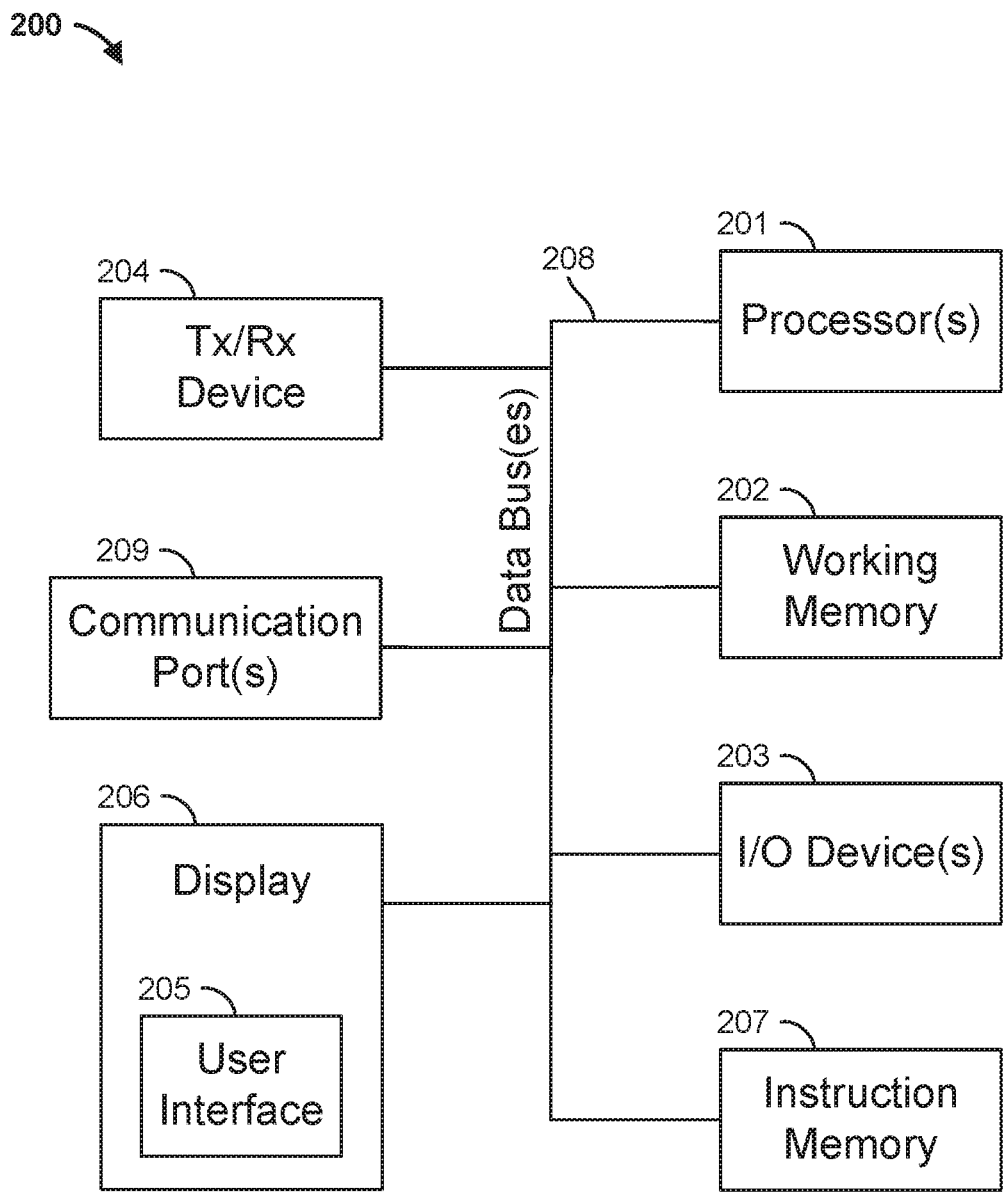
FIG. 2 is a block diagram of the advertisement recommendation computing device of the digital advertisement recommendation system of FIG. 1 in accordance with some embodiments.

FIG. 2 illustrates the advertisement recommendation computing device 102 of FIG. 1. Advertisement recommendation computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of advertisement recommendation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with advertisement recommendation computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 advertisement recommendation computing device 102 will be operating in. Processor(s) 201 is operable to receive data from, or send data to, a network, such as communication network 118 of FIG. 1, via transceiver 204.

Figure 3:
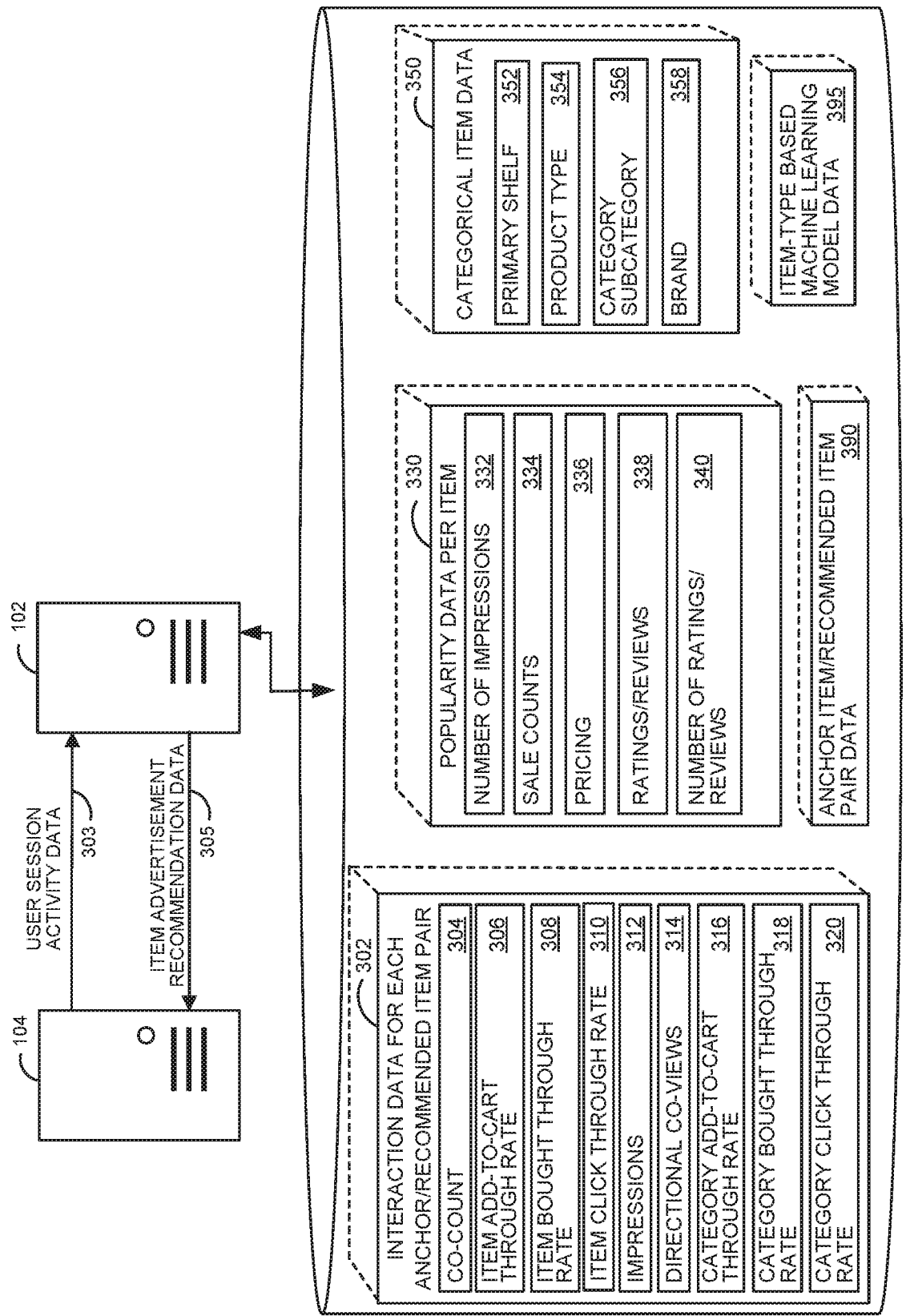
FIG. 3 is a block diagram illustrating examples of various portions of the digital advertisement recommendation system of FIG. 1 in accordance with some embodiments.

FIG. 3 is a block diagram illustrating examples of various portions of the digital advertisement recommendation system 100 of FIG. 1. As indicated in the figure, advertisement recommendation computing device 102 may receive user session activity data 303 from web server 104. User session activity data 303 may identify data associated with browsing sessions of a plurality of users (e.g., customers). For example, user session activity data 303 may identify item advertisements viewed, item advertisements engaged, purchases made through clicking on an item advertisement, item impressions, items added to online shopping carts, co-counts, and any other data related to website browsing sessions. Advertisement recommendation computing device 102 may receive user session activity data 303, and generate and/or update feature data used to train a machine learning process.

For example, based on user session activity data 303, advertisement recommendation computing device 102 may generate at least portions of interaction data 302 for each anchor/recommended item pair. Advertisement recommendation computing device 102 may, for example, parse user session activity data 303 to identify session data related to a particular anchor item, identify at least one recommended item associated with the particular anchor item (e.g., a recommended item that was displayed on an item page of the anchor item), and generate interaction data 302 for that anchor item/recommended item pair 302. Advertisement recommendation computing device 102 may store interaction data 302 in database 116.

Interaction data 302 may include, for each anchor item/recommended item pair, a co-count 304, an item add-to-cart through rate 306, an item bought through rate 308, and an item click-through rate 310. The item add-to-cart through rate 306 may identify a value (e.g., a rate) indicative of how many times a recommended item was added to an online shopping cart. The item bought through rate 308 may identify a value (e.g., a rate) indicative of how many times a recommended item was purchased. The item click-through rate 310 may identify a value (e.g., a rate) indicative of how many times an advertisement for the recommended item was engaged. These rates may be based on when the recommended item was displayed with the anchor item. For example, for a given anchor-recommended item pair, if the recommendation is viewed 10 times and engaged (e.g., clicked) 2 times, then the click through rate is 2/10.

Interaction data 302 may also include impressions 312 for the recommended item, and directional co-views 314. For a given anchor-recommendation pair, directional co-views 314 may identify, for example, a number of times the recommendation is viewed strictly after the anchor item is viewed during a same user session.

Interaction data 302 may further include category add-to-cart through rate 316, category bought through rate 318, and category click-through rate 320. Category add-to-cart through rate 316 may identify a value (e.g., a rate) indicative of how many times items within a category of the recommended item was added to an online shopping cart. Category bought through rate 318 may identify a value (e.g., a rate) indicative of how many times items in a category of the recommended item were purchased. Category click-through rate 320 may identify a value (e.g., a rate) indicative of how many times advertisements for items in a category of the recommended item was engaged.

In some examples, advertisement recommendation computing device 102 may generate and/or update popularity data 330 based on user session activity data 303. Popularity data 330 may include, for example, a number of impressions 332, which identifies a total number of impressions for an item over a period of time. Popularity data 330 may also include sale counts 334 and pricing 336, which may identify a total number of sales for the item, and the prices paid for the item, over the period of time. Popularity data 330 may further include ratings/reviews 338 and number of ratings/reviews 340, which may be obtained from web server 104 based on ratings and/or reviews posted on a website for each item. Advertisement recommendation computing device 102 may store popularity data 330 in database 116. In some examples, popularity data 330 is also based on transaction data received from store 109. The transaction data may identify item sales made at store 109, for example. In some examples, the transaction data includes receipt data for sale transactions.

Advertisement recommendation computing device 102 may, in some examples, generate and/or update categorical item data 350, which may be stored in database 116. Categorical item data 350 may include, for each item, one or more of a primary shelf 352, a product type 354, a category/subcategory 356, and a brand 358, for example.

Based on one or more of interaction data 302, popularity data 330, and categorical item data 350, advertisement recommendation computing device 102 may execute a machine learning process, such as one based on decision trees, to generate item advertisement recommendation data 305 for one or more anchor items. Item advertisement recommendation data 305 identifies one or more recommended items to be displayed for a corresponding anchor item.

Each anchor item and recommended item pair may be identified, for example, by anchor item/recommended item pair data 390 stored in database 116. For example, advertisement recommendation computing device 102 may receive anchor item/recommended item pair data 390 identifying anchor items and recommended item pairs from another computing device, such as a third-party advertisement recommendation system. In some examples, advertisement recommendation computing device 102 generates anchor item/recommended item pair data 390 based on user input (e.g., a user configures anchor item/recommended item pair data 390).

To execute the machine learning process, advertisement recommendation computing device 102 may obtain item-type based machine learning model data 395 from database 116. Item-type based machine learning model data 395 identifies and characterizes a machine learning process, such as one that is based on a plurality of item-type machine learning models (e.g., where each machine learning model was trained based on data related to a particular item type). Advertisement recommendation computing device 102 may execute the machine learning process to generate, for each of a plurality of anchor items, one or more recommended items to advertise. For example, advertisement recommendation computing device 102 may generate a ranking of recommended items for each anchor item.

Figure 5A:
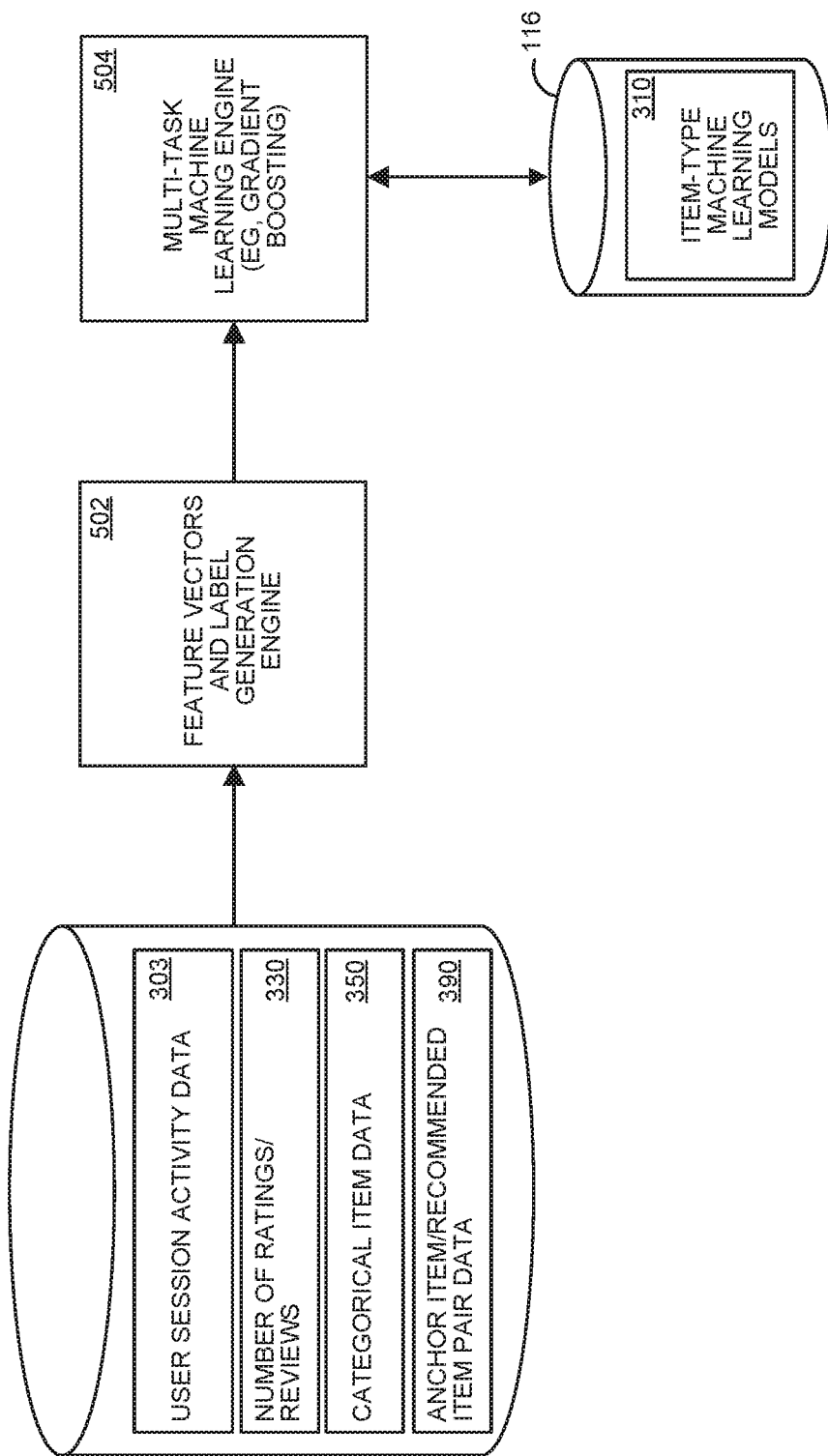
FIGS. 5A, 5B, and 5C illustrate various portions of the digital advertisement recommendation system of FIG. 1 in accordance with some embodiments.
Figure 5B:
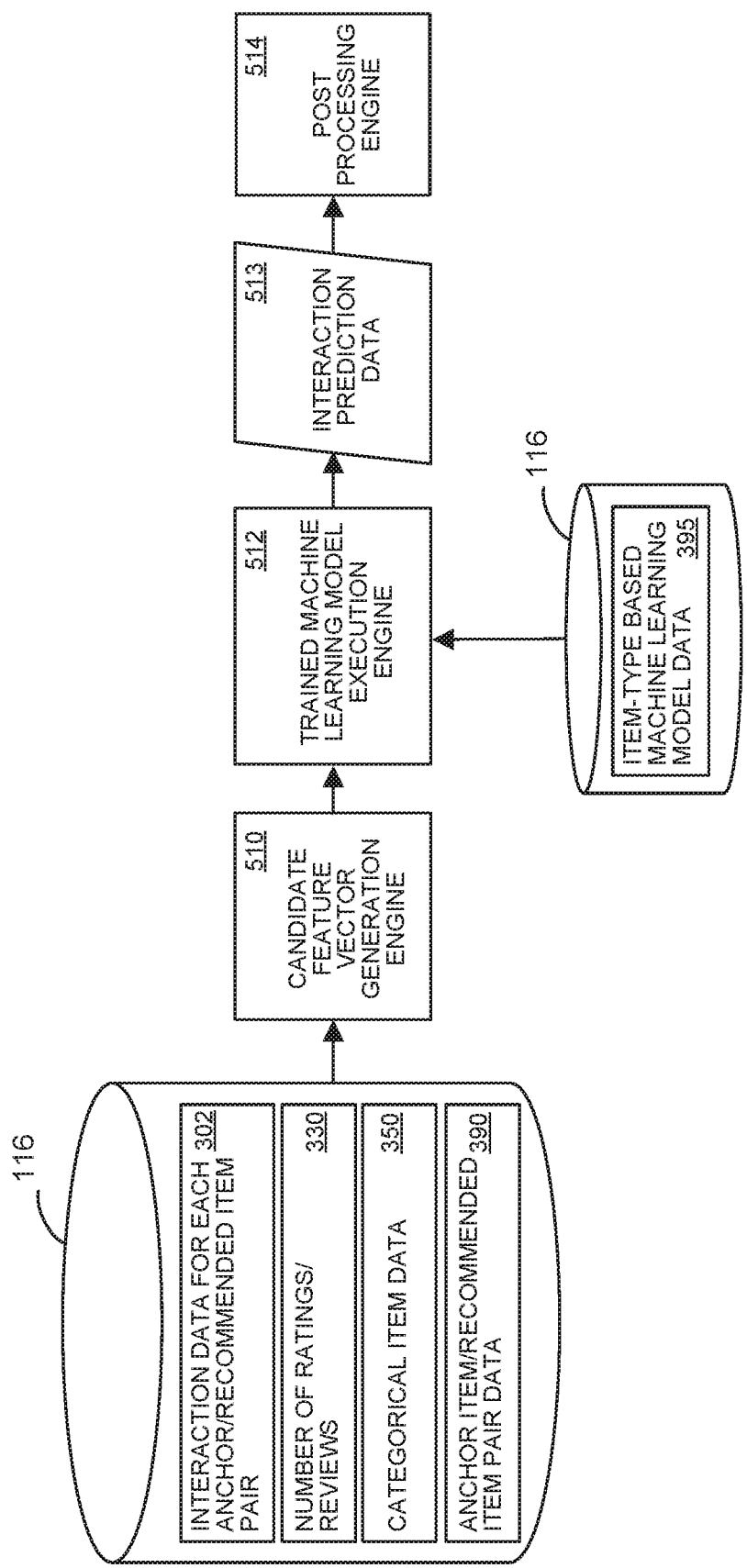
Figure 5C:
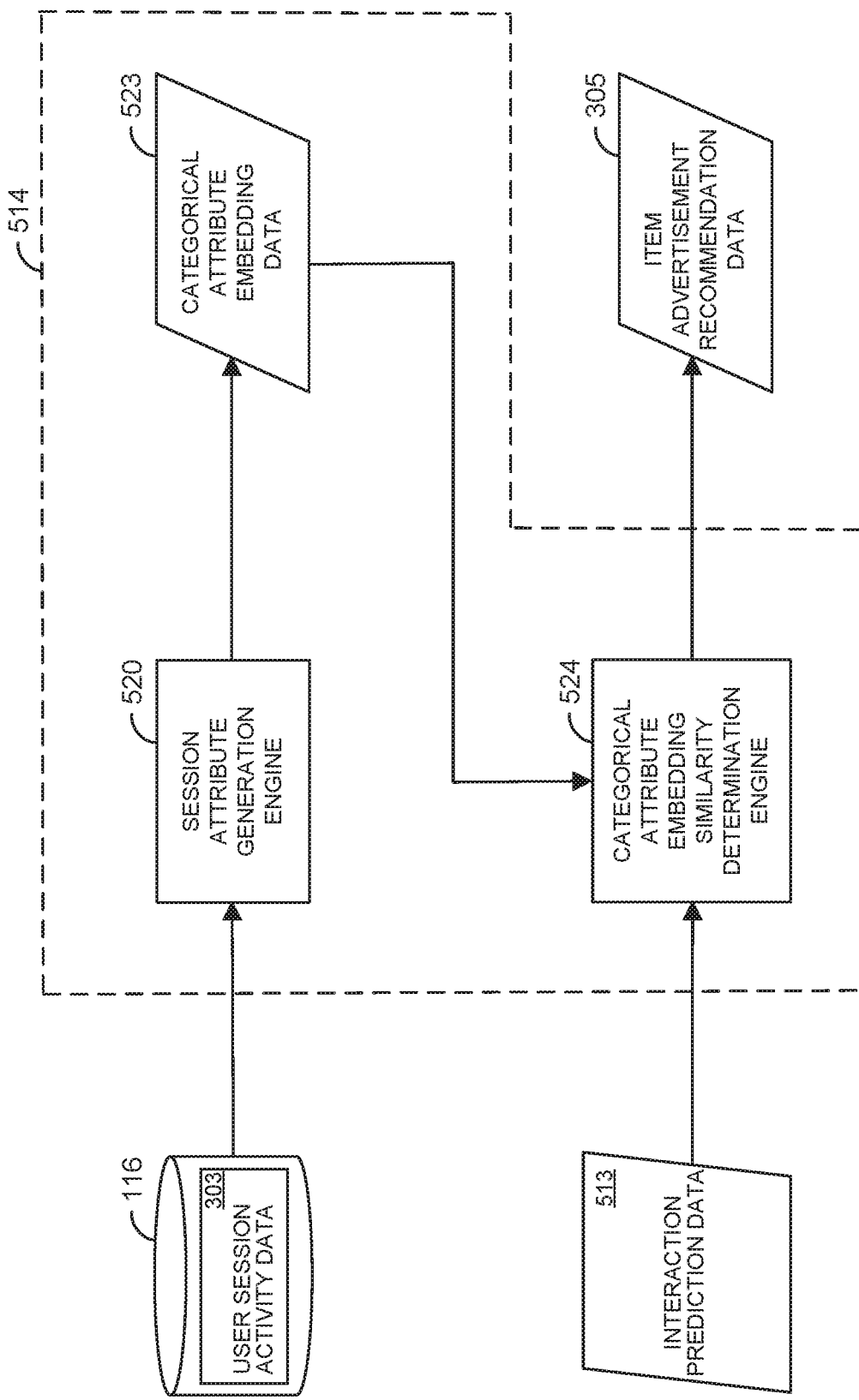

FIGS. 5A, 5B, and 5C illustrates various portions of a digital advertisement recommendation system in accordance with these disclosures, such as the digital advertisement recommendation system 100 of FIG. 1. As illustrated in these figures, advertisement recommendation computing device 102 may include a feature vector and label generation engine 502, a multi-task machine learning engine 504, a candidate feature vector generation engine 510, a trained machine learning model execution engine 512, a post processing engine 514, a session attribute generation engine 520, and a categorical attribute embedding similarity determination engine 524. In some examples, one or more of feature vector and label generation engine 502, multi-task machine learning engine 504, candidate feature vector generation engine 510, trained machine learning model execution engine 512, post processing engine 514, session attribute generation engine 520, and categorical attribute embedding similarity determination engine 524 may be implemented in hardware. In some examples, one or more of feature vector and label generation engine 502, multi-task machine learning engine 504, candidate feature vector generation engine 510, trained machine learning model execution engine 512, post processing engine 514, session attribute generation engine 520, and categorical attribute embedding similarity determination engine 524 may be implemented as an executable program maintained in a tangible, non-transitory memory, such as instruction memory 207 of FIG. 2, which may be executed by one or processors, such as processor 201 of FIG. 2.

Referring to FIG. 5A, feature vector and label generation engine 502 may obtain anchor item/recommended item pair data 390, and corresponding interaction data 302, popularity data 330, and categorical item data 350, from database 116 and, generate feature vectors for each anchor/recommended item pair. For example, each feature vector may identify the anchor item, the recommended item, and corresponding features. In some examples, the features include co-count, contextual, and categorical features, as well as aggregated view-buy count features.

Multi-task machine learning engine 504 receives the feature vectors from feature vector and label generation engine 502, and trains item-type based machine learning models identified by item-type based machine learning model data 395 with the obtained feature vectors. In some examples, item-type based machine learning model data 395 identifies a machine learning model in item-type based machine learning model data 395 for each item type. Multi-task machine learning engine 504 may train each machine learning model based on feature vectors for the corresponding item type.

Referring to FIG. 5B, candidate feature vector generation engine 510 generates candidate feature vectors for an anchor item. Each candidate feature vector may be generated based on a recommended item to advertise on a webpage displaying the anchor item. For example, advertisement recommendation computing device 102 may receive, for each of a plurality of anchor items, a plurality of recommended items to advertise. Candidate feature vector generation engine 510 may generate a feature vector for each recommended item. Candidate feature vector generation engine 510 may generate each feature vector based on corresponding interaction data 302, popularity data 330, and categorical item data 350 obtained from database 116.

Trained machine learning model execution engine 512 obtains the generated feature vectors from candidate feature vector generation engine 510, and executes the trained machine learning process identified by item-type based machine learning model data 395. Based on the execution, trained machine learning model execution engine 512 generates interaction prediction data 513 identifying predicted data values corresponding to a future time period (e.g., for a specific time slot, day of the week, month, etc.). For example, for each anchor item and candidate recommended item pair, trained machine learning model execution engine 512 may execute the trained machine learning model to generate view-buy count data identifying a number of times, during the future time period, that an advertisement for the recommended item, if displayed with the anchor item, will be viewed or engaged. In some examples, the view-buy count data identifies a predicted number of times that the recommended item will be bought if displayed with the anchor item. Based on the predicted view-buy count data, trained machine learning model execution engine 512 may rank advertisements for recommended items.

Post processing engine 514 obtains interaction prediction data 513 from trained machine learning model execution engine 512, and filters out recommended item advertisements based on user sessions data. FIG. 5C shows an example of post processing engine 514. As illustrated in FIG. 5C, session attribute generation engine 520 obtains user session activity data 303 from database 116, and generates categorical attribute embeddings data 523. Categorical attribute embeddings data 523 identify categories of items identified in user session activity data 303. Categorical attribute embeddings data 523 may be generated, for example, based on an embedding model that processes text, such as a category of an item. The embedding model's input may be the name of the category of the item, for example, (e.g., text corpus), and the output may be an embedding vector.

Categorical attribute embedding similarity determination engine 524 may generate item advertisement recommendation data 305 based on a similarity between categories identified by categorical attribute embeddings data 523 and categories of recommended items for items corresponding to interaction prediction data 513. For example, categorical attribute embedding similarity determination engine 524 may generate character embeddings for categories of items corresponding to interaction prediction data 513. Categorical attribute embedding similarity determination engine 524 may compute a distance between each generated recommended item character embedding and categorical attribute embeddings data 523. The distance may be based on a computed similarity (e.g., cosine similarity) between the embedding of an anchor item's category (e.g., as identified by categorical attribute embeddings data 523) and the embedding of recommendation item's category.

If some examples, at least one distance is below a threshold, the recommended item corresponding to interaction prediction data 513 is allowed (e.g., is identified by item advertisement recommendation data 305). Otherwise, if no distance (for a given recommended item) is below the threshold, the recommended item corresponding to interaction prediction data 513 is not allowed (e.g., is not identified by item advertisement recommendation data 305).

In some examples, a mean similarity of different categorical attributes (e.g., primary shelf, reporting hierarchy, product type) of the anchor item and the recommended item is computed. If the mean is above a threshold, the recommendation is allowed. Otherwise, if the mean similarity is below the threshold, the recommendation item is not allowed.

Figure 6:
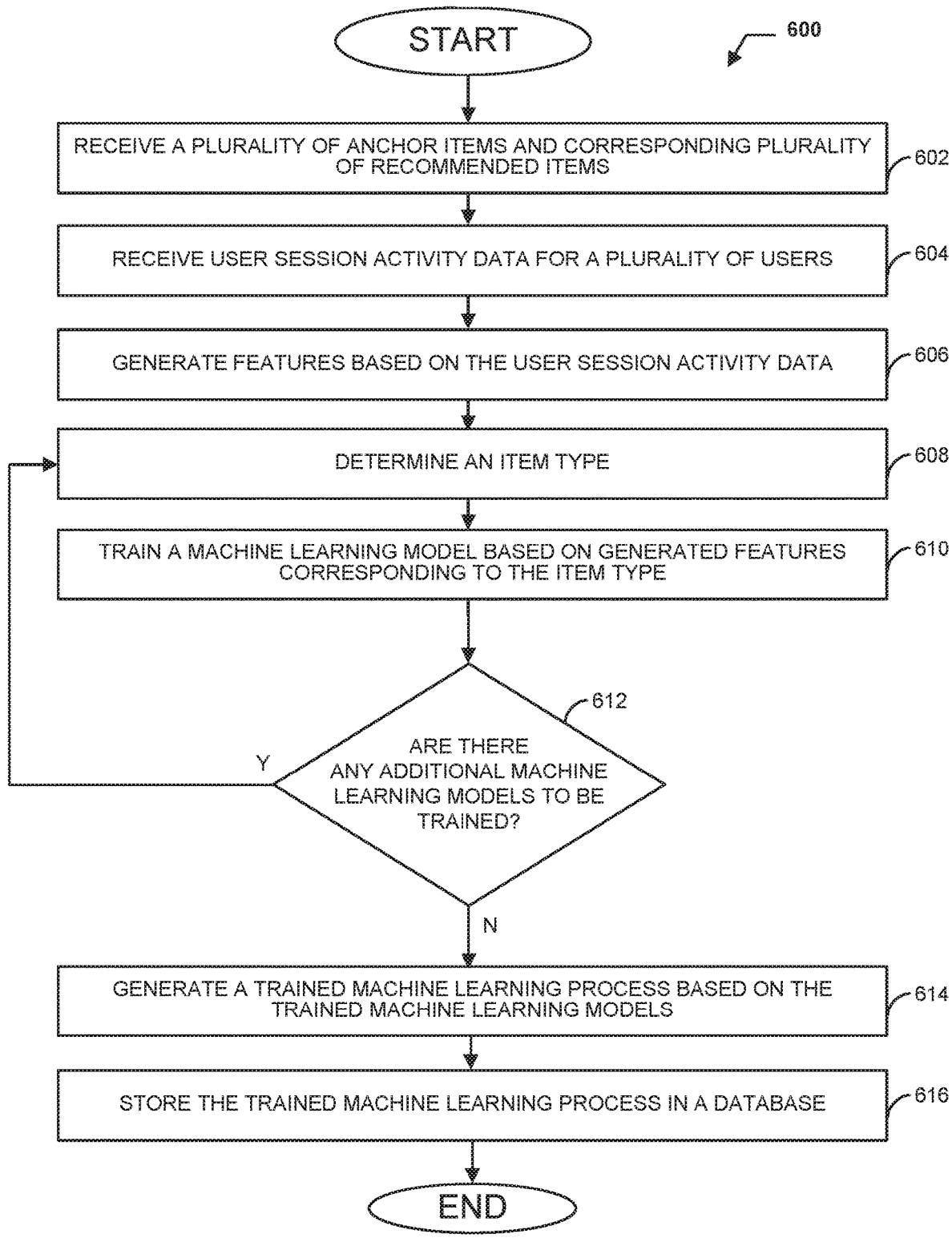
FIG. 6 is a flowchart of an example method that can be carried out by the advertisement recommendation computing device of FIG. 2 in accordance with some embodiments.

FIG. 6 is a flowchart of an example 600 that can be carried out by the digital advertisement recommendation system 100 of FIG. 1. Beginning at step 602, a plurality of anchor items and a corresponding plurality of recommended items for each anchor item is received. At step 604, user session activity data 303 is received for a plurality of users. At step 606, features are generated based on the user session activity data 303. For example, interaction data 302, popularity data 330, and categorical item data 350 may be generated based on the user session activity data 303. Features may then be generated based on the interaction data 302, popularity data 330, and categorical item data 350. For example, feature vectors and label generation engine 502 may generate the features.

Proceeding to step 608, an item type is determined. The item type may be an item type of an item associated with the user session activity data 330, for example. At step 610, a machine learning model corresponding to the item type is trained based on generated features corresponding to the item type. For example, the item type may be an item category. The machine learning model may be trained with features generated from data (e.g., interaction data 302, popularity data 330, and categorical item data 350) including items in the item category. At step 612, a determination is made as to whether there are any additional machine learning models to train. If another machine learning model is to be trained, the method proceeds back to step 608, where another item type is determined. Otherwise, if there are no additional machine learning models to train, the method proceeds to step 614.

At step 614, a trained machine learning process is generated based on the trained machine learning models. The trained machine learning process may include the trained machine learning models. For example, upon receive data related to a recommended item, the trained machine learning process may execute a corresponding machine learning model based on an item type of the recommended item. Proceeding to step 616, the trained machine learning process is stored in a database. For example, the trained machine learning process may be stored in database 116 as item-type based machine learning model data 395. The method then ends.

Figure 7:
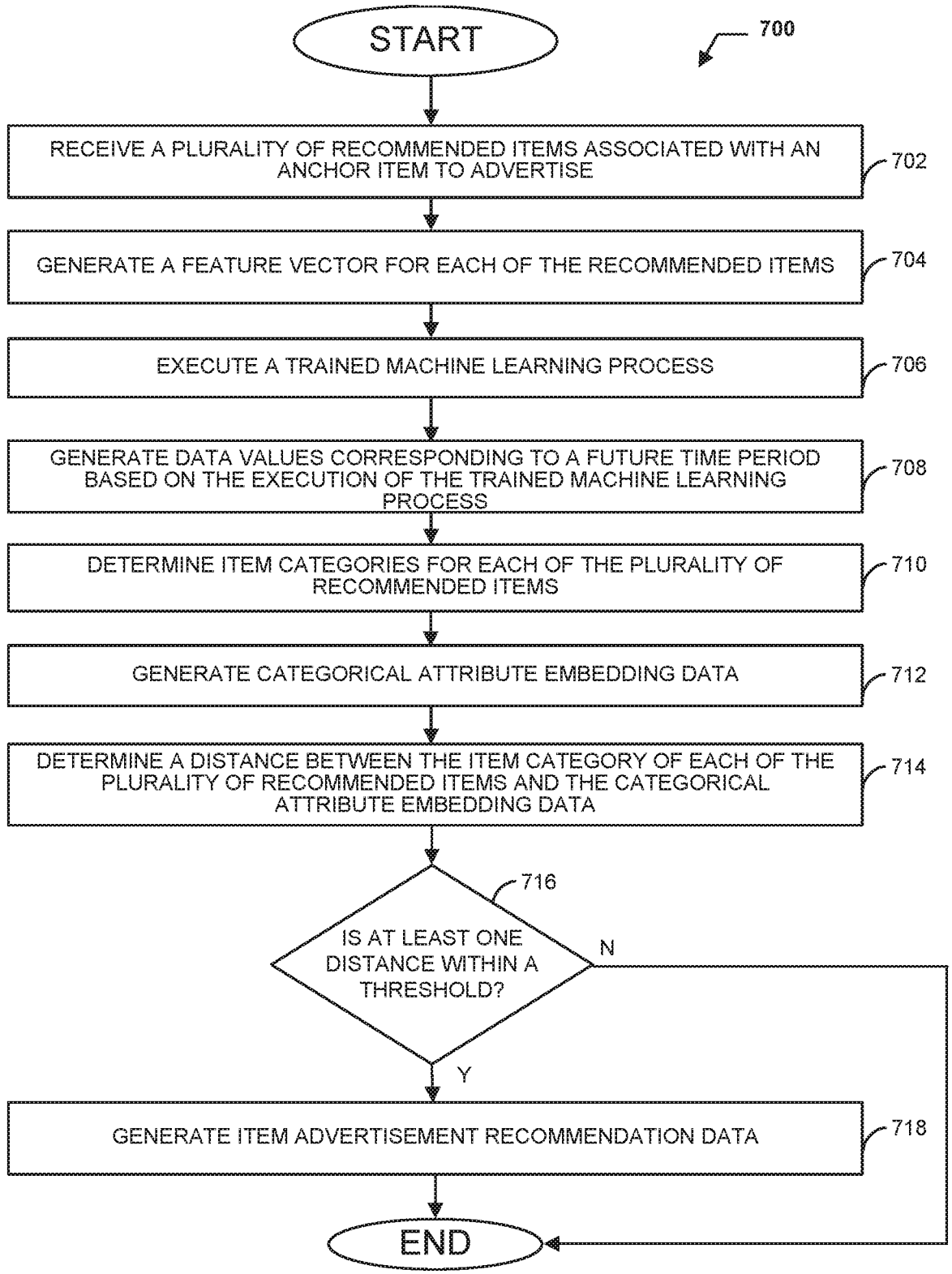
FIG. 7 is a flowchart of another example method that can be carried out by the advertisement recommendation computing device of FIG. 2 in accordance with some embodiments.

FIG. 7 is a flowchart of an example method 700 that can be carried out by the digital advertisement recommendation system 400 of FIG. 4. At step 702, a plurality of recommended items associated with an anchor item to advertise are received. At step 704, a feature vector is generated for each of the plurality of recommended items. Each feature vector may identify, for example, the anchor item, the recommended item, co-count features, contextual features, categorical features, as well as aggregated view-buy count features.

Proceeding to step 706, a trained machine learning process is executed. For example, item-type based machine learning model data 395 may be obtained from database 116, and the trained machine learning process identified and characterized may be executed. The machine learning process may be based on decision trees, for example. At step 708, based on execution of the machine learning process, data values corresponding to a future time period are generated. For example, the data may be view-buy count data, where the view-buy count data identifies a predicted number of times a recommended item will be purchased during the future time period.

Proceeding to step 710, item categories for each the plurality of recommended items are determined. For example, the category for each item may be determined based on obtaining data from a database identifying item properties, such as item categories. At step 712, categorical attribute embedding data 523 is generated. Categorical attribute embedding data 523 identifies category item embeddings and may be generated, for example, based on user session activity data 303. At step 714, a distance between the item category of each of the plurality of recommended items and the categorical attribute embedding data 523 is determined.

At step 716, a determination is made as to whether at least one determined distance is within a threshold. If at least one computed distance is within the threshold, the method proceeds to step 718. At step 718, item advertisement recommendation data 305 is generated indicating that the recommended item is to be advertised. The method then ends. Otherwise, if at step 716 the at least one computed distance is not within the threshold, the method ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
  a user device including at least one processor, a memory coupled to the at least one processor, and a display; and
  a computing device including at least one processor and a memory coupled to the at least one processor, the at least one processor configured to generate recommendations during said session by executing instructions that cause the at least one processor to:
    receive, from the user device during a current user session, session activity data of a user associated with the user device, the session activity data comprising an anchor item, the anchor item being identified based on a webpage being displayed on the display of the user device including the anchor item;
    obtain, from a database, historical session activity data associated with one or more other users received during other user sessions;
    obtain, from the database, a plurality of recommended items pertaining to the anchor item;
    generate, for each recommended item of the plurality of recommended items, feature data comprising features based on the session activity data;
    update the feature data based on the historical session activity data;
    determine an item type of the anchor item and the plurality of recommended items;
    train a machine learning process using the updated feature data;
    execute the trained machine learning process;
    generate prediction data for each of the recommended items based on output from the execution of the trained machine learning process;
    generate a ranking of the plurality of recommended items based on the prediction data;
    generate categorical attribute embeddings based on the session activity data;
    filter the ranking of the plurality of recommended items based on the categorical attribute embeddings, wherein filtering the ranking of the plurality of recommended items comprises:
      determining a distance value between a category of each recommended item of the plurality of recommended items and the categorical attribute embeddings;
    transmit the plurality of recommended items and the ranking of the plurality of recommended items to the user device; and
    display, during the current user session, the plurality of recommended items and the ranking on the webpage being displayed on the display of the user device.

2. The system of claim 1, wherein the feature data includes interaction features for each recommended item of the plurality of recommended items based on the session activity data.

3. The system of claim 2, wherein the feature data includes popularity features for each recommended item of the plurality of recommended items based on the session activity data,
  wherein popularity features include at least one of ratings and reviews of each recommended item.

4. The system of claim 3, wherein the feature data includes categorical item features for each recommended item of the plurality of recommended items, the categorical item feature comprising a taxonomical hierarchy.

5. The system of claim 1, wherein the prediction data for each of the recommended items identifies a predicted number of times each recommended item will be purchased during a future time period.

6. The system of claim 1, wherein generating the feature data based on the session activity data comprises generating a feature vector for each recommended item of the plurality of recommended items, wherein the feature vector for each recommended item identifies the anchor item, the recommended item, and the features.

7. The system of claim 6, wherein the features include aggregated co-count, contextual, categorical, and aggregated view-buy count features.

8. The system of claim 1, wherein filtering the ranking of the plurality of recommended items further comprises: removing a recommended item of the plurality of recommended items from the ranking of the plurality of recommended items if at least one corresponding distance value is not at least a threshold value.

9. The system of claim 1, wherein the computing device is configured to train the trained machine learning process with interaction data, popularity data, and categorical data for a first period of time.

10. The system of claim 9, wherein the computing device is configured to periodically train the trained machine learning process with the interaction data, the popularity data, and the categorical data for a second period of time, wherein the second period of time is less than the first period of time.

11. The system of claim 1, wherein the trained machine learning process comprises a plurality of machine learning models, wherein each machine learning model is trained with updated feature data of a different determined item type.

12. A method comprising:
  receiving, from a user device during a current user session, session activity data of a user associated with the user device, the session activity data comprising an anchor item, the anchor item being identified based on a webpage being displayed on a display of the user device including the anchor item;
  obtaining, from a database, historical session activity data associated with one or more other users received during other user sessions;
  obtaining, from the database, a plurality of recommended items pertaining to the anchor item;
  generating, for each recommended item of the plurality of recommended items, feature data comprising features based on the session activity data;

updating the feature data using the historical session activity data;
determining an item type of the anchor item and the plurality of recommended items;
training a machine learning process using the updated feature data;
executing trained machine learning process;
generating prediction data for each of the recommended items based on output from the execution of the trained machine learning process;
generating a ranking of the plurality of recommended items based on the prediction data;
generating categorical attribute embeddings based on the session activity data;
filtering the ranking of the plurality of recommended items based on the categorical attribute embeddings, wherein filtering the ranking of the plurality of recommended items comprises:
determining a distance value between a category of each recommended item of the plurality of recommended items and the categorical attribute embeddings;
transmitting the plurality of recommended items and the ranking of the plurality of recommended items to the user device; and
displaying, during the current user session, the plurality of recommended items and the ranking on the webpage being displayed on the display of the user device.

13. The method of claim 12, wherein the prediction data for each of the recommended items identifies a predicted number of times each recommended item will be purchased during a future time period.

14. The method of claim 12, wherein the categorical attribute embedding uses the session activity data to determine item categories, and wherein filtering the ranking of the plurality of recommended items is based on the categorical attribute embeddings.

15. The method of claim 12, further comprising training the trained machine learning process with interaction data, popularity data, and categorical data, wherein popularity data includes at least one of ratings and reviews of each recommended item.

16. A non-transitory computer readable medium having instructions stored thereon, wherein the instructions, when executed by at least one processor, cause a device to perform operations comprising:
receiving, from a user device during a current user session, session activity data of a user associated with the user device, the session activity data comprising an anchor item, the anchor item being identified based on a webpage being displayed on a display of the user device including the anchor item;
obtaining, from a database, historical session activity data associated with one or more other users received during other user sessions;
obtaining, from the database, a plurality of recommended items pertaining to the anchor item;
generating, for each recommended item of the plurality of recommended items, feature data comprising features based on the session activity data;
updating the feature data using on the historical session activity data; determining an item type of the anchor item and the plurality of recommended items;
training a machine learning process using the updated feature data;
executing the trained machine learning process;
generating prediction data for each of the recommended items based on output from the execution of the trained machine learning process;
generating a ranking of the plurality of recommended items based on the prediction data;
generating categorical attribute embeddings based on the session activity data;
filtering the ranking of the plurality of recommended items based on the categorical attribute embeddings;
determining a distance value between a category of each recommended item of the plurality of recommended items and the categorical attribute embeddings by using one of cosine similarity and mean similarity;
transmitting the plurality of recommended items and the ranking of the plurality of recommended items to the user device; and
displaying, during the current user session, the plurality of recommended items and the ranking on the webpage being displayed on the display of the user device.

17. The non-transitory computer readable medium of claim 16, wherein the prediction data for each of the recommended items identifies a predicted number of times each recommended item will be purchased during a future time period.

18. The non-transitory computer readable medium of claim 16, wherein the operations comprise training the trained machine learning process with interaction data, popularity data, and categorical data.

* * * * *